UNITED STATES PATENT OFFICE.

WERNER SCHULTZ, OF CHARLOTTENBURG, GERMANY.

BACTERIAL PRODUCT.

1,005,076. Specification of Letters Patent. Patented Oct. 3, 1911.

No Drawing. Application filed January 18, 1910. Serial No. 538,665.

*To all whom it may concern:*

Be it known that I, WERNER SCHULTZ, a subject of the Emperor of Germany, residing at Charlottenburg, near Berlin, Germany, have invented certain new and useful Improvements in Bacterial Products; and I do hereby declare the following to be a full, clear, and exact description of the invention, such as will enable others skilled in the art to which it appertains to make and use the same.

The subject of my invention is a process of obtaining a liquid preparation for diagnostic and curative purposes.

According to my invention the method of carrying out the new process is to separate the bacilli from the nutritive solution and then wash them with sterilized water and shake up with a weak aqueous solution of carbolic acid hereupon the bacterial remnants are removed by filtering. To the resultant solution there is then added a suitable iron compound (such for example as iron oxychlorid solution) and the precipitate thus obtained, after being thoroughly washed till free from chlorin and albumin, is dissolved in diluted soda lye. When the washed bacilli are extracted with carbolic acid, it is a soluble extract of the bacilli themselves which reacts with the iron. This method is particularly suitable for preparing tuberculin and has the advantage that the product is essentially purer than tuberculin as hitherto prepared. The latter, as is well known, contains as by-products salts and the albumin of the nutritive meat juice, which are by no means neutral. By means of the present invention, on the other hand, I obtain a preparation free from the said by-products, and employ an inorganic ingredient in order to render the product more suitable for certain medico-clinical uses. The presence of albumin combined with iron being not detectable immediately by means of potassium-ferrocyanid and ammonium rhodanid but only after acidifying with hydrochloric acid. For this purpose the surface-cultures of the tubercle-bacilli are separated from the nutritive meat juice and freed from the adhering remnants of the latter by washing with sterilized water, and then shaken up with a weak aqueous carbolic acid solution. Hereupon the resultant liquid is separated from the bacterial remnants by filtration and there is added to it a suitable compound (such for instance as iron oxychlorid solution). The resulting precipitate (which contains solely the extractive materials which have been present in the bodies of the tubercle-bacilli in combination with iron) is now washed until all traces of chlorin and albumin have disappeared, and is finally dissolved in dilute soda lye. This solution constitutes the new preparation.

If a preparation is desired which shall also be free from the fatty material of the tubercle-bacilli, the pure cultures separated from the nutritive meat juice and washed, are first shaken up with ether or the like and then treated as above described.

The advantage of the new preparation as compared with the prior tuberculin consists not only in its greater purity, but mainly in its being obtained always of uniform composition, which is a matter of much importance in the measurement of doses in practice.

A specific example showing definite amounts of ingredients used in the process is given in the following. The solution of carbolic acid is of 0.5%, the solution of iron oxychlorid is of 12%, the dilute soda lye is of 1%. A culture of bacilli grown on 250 cubic centimeters culture medium is separated from the latter, washed with sterilized water and shaken up with the solution of carbolic acid. To this solution after filtering of the bacilli 60 cubic centimeters of the solution of iron-oxychlorid are added, whereby the precipitate results which reaches the amount of 32 cubic centimeters. This quantity of the precipitate is, after being washed until all traces of chlorin and albumin have disappeared, dissolved with 30 to 50 drops of dilute soda lye of 1%.

What I claim is—

1. The process of obtaining a preparation of the nature herein described, consisting in separating pure cultures of bacilli from the nutritive medium, washing the bacilli with sterilized water, shaking up with a solution of carbolic acid, filtering of the bacilli adding an iron compound to the resultant liquid, washing the precipitate, and dissolving it in dilute soda lye.

2. The process of obtaining a preparation of the nature herein described, consisting in separating pure cultures of tubercule-bacilli from nutritive meat juice, washing the bacilli with sterilized water, shaking up with a solution of carbolic acid filtering off the bacilli, adding an iron compound to the resultant liquid, washing the precipitate, and dissolving it in dilute soda lye.

3. As new products the herein described bacterial-preparations suitable for medico-clinical use, being soluble in dilute caustic soda-lye and containing bacterial-albumin combined with iron, the presence of the latter being not detectable immediately by means of potassium-ferrocyanid and ammonium rhodanid, but only after acidifying with hydrochloric acid.

In testimony whereof I affix my signature in presence of two witnesses.

WERNER SCHULTZ.

Witnesses:
 HUGH GRAMATKI,
 LARAPED BEISHAN.

Copies of this patent may be obtained for five cents each, by addressing the "Commissioner of Patents, Washington, D. C."